US007753232B2

(12) United States Patent
Keyes et al.

(10) Patent No.: US 7,753,232 B2
(45) Date of Patent: Jul. 13, 2010

(54) FLUID DISPENSING APPARATUS

(76) Inventors: Denis E. Keyes, 8710 Midnight Pass Rd., #301B, Sarasota, FL (US) 34242; John Randall, 72 Stratford Dr., Freehold, NJ (US) 07728

(*) Notice: Subject to any disclaimer, the term of this patent is extended or adjusted under 35 U.S.C. 154(b) by 869 days.

(21) Appl. No.: 11/199,636

(22) Filed: Aug. 9, 2005

(65) Prior Publication Data
US 2007/0034643 A1 Feb. 15, 2007

(51) Int. Cl.
*B67D 3/08* (2006.01)
(52) U.S. Cl. .................. 222/64; 222/160; 222/162; 222/422; 222/537; 222/1; 137/577
(58) Field of Classification Search ............... 222/1.64, 222/160, 162, 163, 204, 420, 422, 500, 505, 222/526, 527, 537; 141/230, 284; 137/123, 137/142, 152, 577
See application file for complete search history.

(56) References Cited

U.S. PATENT DOCUMENTS

| 649,313 | A | * | 5/1900 | Jewell | 137/151 |
|---|---|---|---|---|---|
| 754,132 | A | * | 3/1904 | Fulton | 222/204 |
| 1,651,690 | A | | 12/1927 | Furlong | |
| 2,814,303 | A | | 11/1957 | Fifer | |
| 3,190,497 | A | * | 6/1965 | Anthon | 222/64 |
| 3,399,638 | A | * | 9/1968 | Bishop et al. | 111/9 |
| 4,573,502 | A | * | 3/1986 | Hurley et al. | 141/1 |
| 5,090,594 | A | | 2/1992 | Randall, Jr. et al. | |
| 5,316,196 | A | | 5/1994 | Reich | |
| 5,480,063 | A | | 1/1996 | Keyes | |
| 5,680,960 | A | | 10/1997 | Keyes | |
| 2004/0164092 | A1 | | 8/2004 | DiLeo | |

FOREIGN PATENT DOCUMENTS

EP        0289763 A2    11/1988

OTHER PUBLICATIONS

Extended European Search Report dated Oct. 23, 2009 re Application No. 06 801 168.3-2209.

* cited by examiner

*Primary Examiner*—J. Casimer Jacyna
(74) *Attorney, Agent, or Firm*—Coats & Bennett, P.L.L.C.

(57) ABSTRACT

A fluid dispensing apparatus is configured to dispense a predetermined volume of fluid, and includes a fluid reservoir to hold a fluid to be dispensed, a dispense tube to dispense the fluid, and an elevator mechanism. The fluid reservoir receives a fluid from a fluid supply. A dispense tube has a dispense outlet, and is connected to an outlet port on the fluid reservoir. The elevator mechanism changes a relative vertical displacement between the dispense outlet and the outlet port, such that the fluid is dispensed when the dispense outlet is lower than the outlet port, and not dispensed when the dispense outlet is higher than the outlet port.

16 Claims, 11 Drawing Sheets

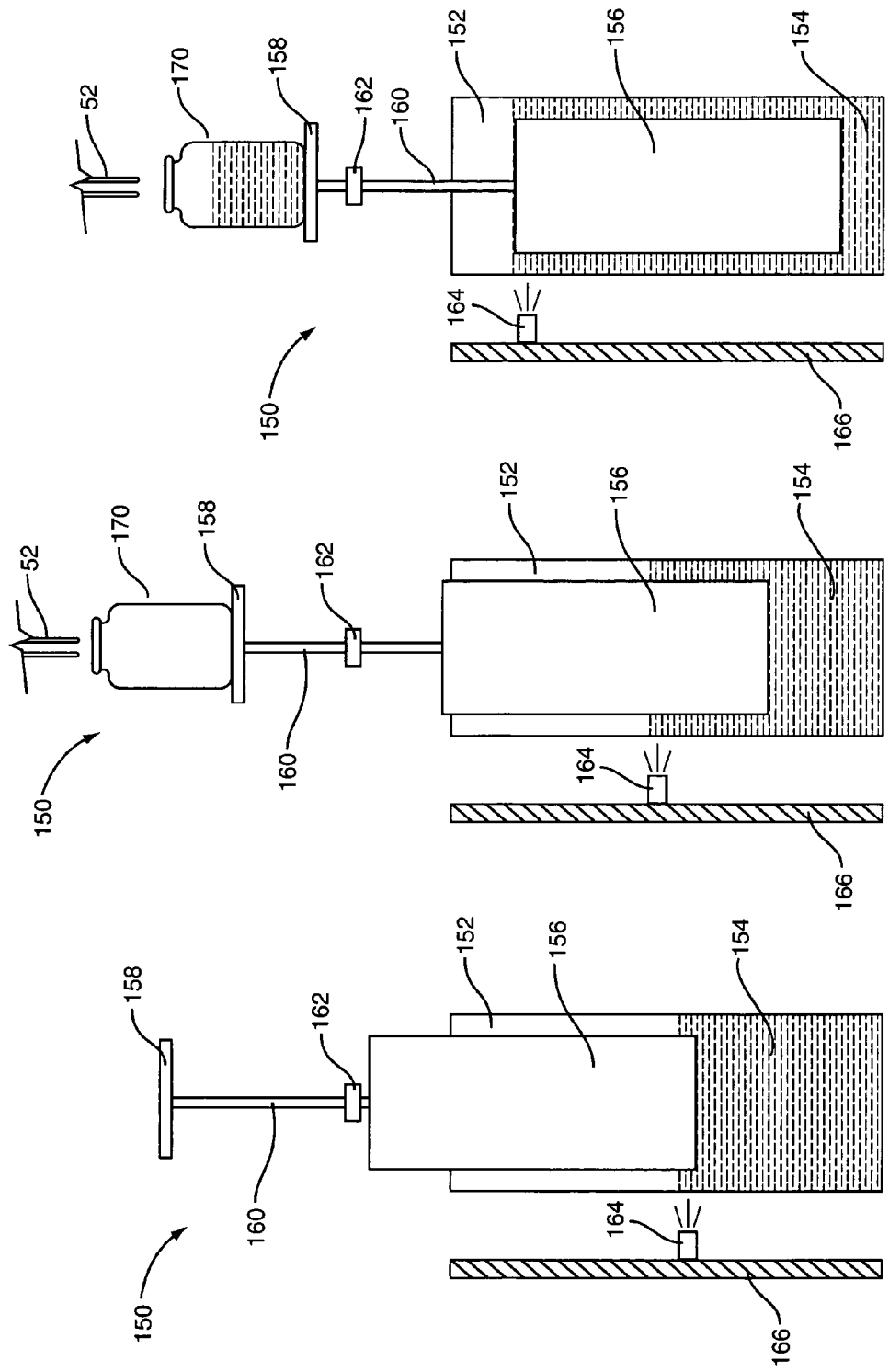

FLUID DISPENSING APPARATUS

BACKGROUND

The present invention relates generally to fluid dispensing devices, and particularly to volumetric fluid dispensing devices that dispense a predetermined volume of fluid.

There are many types of fluid dispensing devices currently available. For example, one type of fluid dispensing device that is currently in widespread use is known as a positive displacement filler. Some positive displacement fillers employ a piston and cylinder arrangement to alternately draw and expel a fluid to be dispensed. The piston draws the fluid into the cylinder when it moves in one direction (e.g., a downward stroke), and expels the fluid from the cylinder when it moves in an opposite direction (e.g., an upward stroke). The expelled fluid enters the bottle or container through a tube connected to the cylinder. Other types of positive displacement fillers may employ rotary pumps or diaphragm pumps to alternately draw and expel the fluid.

Another type of fluid dispensing device is known as a time/pressure filler. Generally, these types of devices include a fluid holding tank that maintains the fluid at a relatively constant pressure. Fluid is dispersed into the bottle or container through a length of compressible tubing connected to the tank. A pinch-type valve operates on the tubing to alternately allow and restrict the flow of fluid into the bottle. Operation of the valve may be controlled using a timer, such that the valve opens and closes for predetermined lengths of time. Because the pressure is maintained at a relatively constant level within the reservoir, the same amount of fluid should be dispensed whenever the valve opens.

A third type of fluid dispensing device is known as a volumetric fluid dispensing device. These types of devices first measure a predetermined volume of fluid before dispensing the fluid into the bottle or container. Generally, a fill tube is disposed between the reservoir and the bottle that holds the predetermined volume of fluid to be dispensed. The fill tube may comprise a compressible tube with a pinch-type valve. When the fill tube fills to a specified level, which may be determined by one or more sensors, for example, the pinch-type valve opens to permit the measured fluid to flow through the fill tube and into the bottle or container. Once the fluid is dispensed, the valve closes to stop the flow of fluid until the fill tube once again holds the predetermined amount of fluid.

Another type of volumetric fluid dispensing device uses the net weight of a container or bottle that receives the dispensed fluid. Particularly, the empty bottle or container rests on a balance. As the fluid enters the bottle or container, the balance detects the change in the bottle's weight. When the balance detects that the bottle and fluid have achieved a specified weight, a pinch-type valve closes to stop the flow of fluid into the bottle.

Each of these types of fluid dispensing devices have their advantages, such as speed and/or accuracy, but they also have various disadvantages. Positive displacement fillers, for example, necessarily require that the fluid being dispensed contact the mechanical moving parts of the device. Volumetric fluid dispensing devices use pinch-type valves that tend to warp or degrade the compressible tubing over time. Thus, the fluid being dispensed with these types of devices may become contaminated with undesirable particulate matter. The fluid paths of volumetric fluid dispensing devices cannot be steam sterilized because acceptable materials used in constructing some portions of the dispensing device, such as the fluid reservoir, may melt at autoclave temperatures. Therefore, the user cannot rinse the fluid path with water for injection, and must introduce critical components of the dispensing device to a sterile filling area via an air lock. Additionally, the "hammering" effect of the pinch-type valve could possibly damage some fluids flowing through the compressible tube, for example, protein-based solutions with long molecular chains. Net weight devices are highly accurate, but they require tedious, time-consuming calibration procedures. Further, the fill rate of a net weight device is generally not high enough to warrant their commercial use. Thus, these types of devices are usually relegated to being used as a statistical tool.

SUMMARY

The present invention comprises a fluid dispensing apparatus that includes a fluid reservoir, a dispense tube, and an elevator mechanism. The fluid reservoir receives a fluid from a fluid supply that will be dispensed into a container. The dispense tube has a dispense outlet, and is connected to an outlet port on the fluid reservoir. The elevator mechanism changes a relative vertical displacement between the dispense outlet and the outlet port, such that the fluid is dispensed when the dispense outlet is lower than the outlet port, and not dispensed when the dispense outlet is higher than the outlet port.

In one embodiment, for example, the elevator mechanism changes the relative vertical displacement between the dispense outlet and the outlet port by raising and lowering the dispense tube. In another embodiment, the elevator mechanism changes the relative vertical displacement between the dispense outlet and the outlet port by raising and lowering the fluid reservoir. To control the elevator mechanism, a processor may generate control signals responsive to one or more sensors. The sensors detect a variety of conditions associated with the fluid, such as fluid levels, fluid volume, and net weight of a container being filled, for example. Based on these detected fluid conditions, the processor may control an actuator to raise or lower the elevator mechanism.

BRIEF DESCRIPTION OF THE DRAWINGS

FIGS. 5A-5C illustrate one embodiment of a weight verification mechanism for use with the fluid dispensing apparatus according to one embodiment of the present invention.

DETAILED DESCRIPTION

Figure 1A:
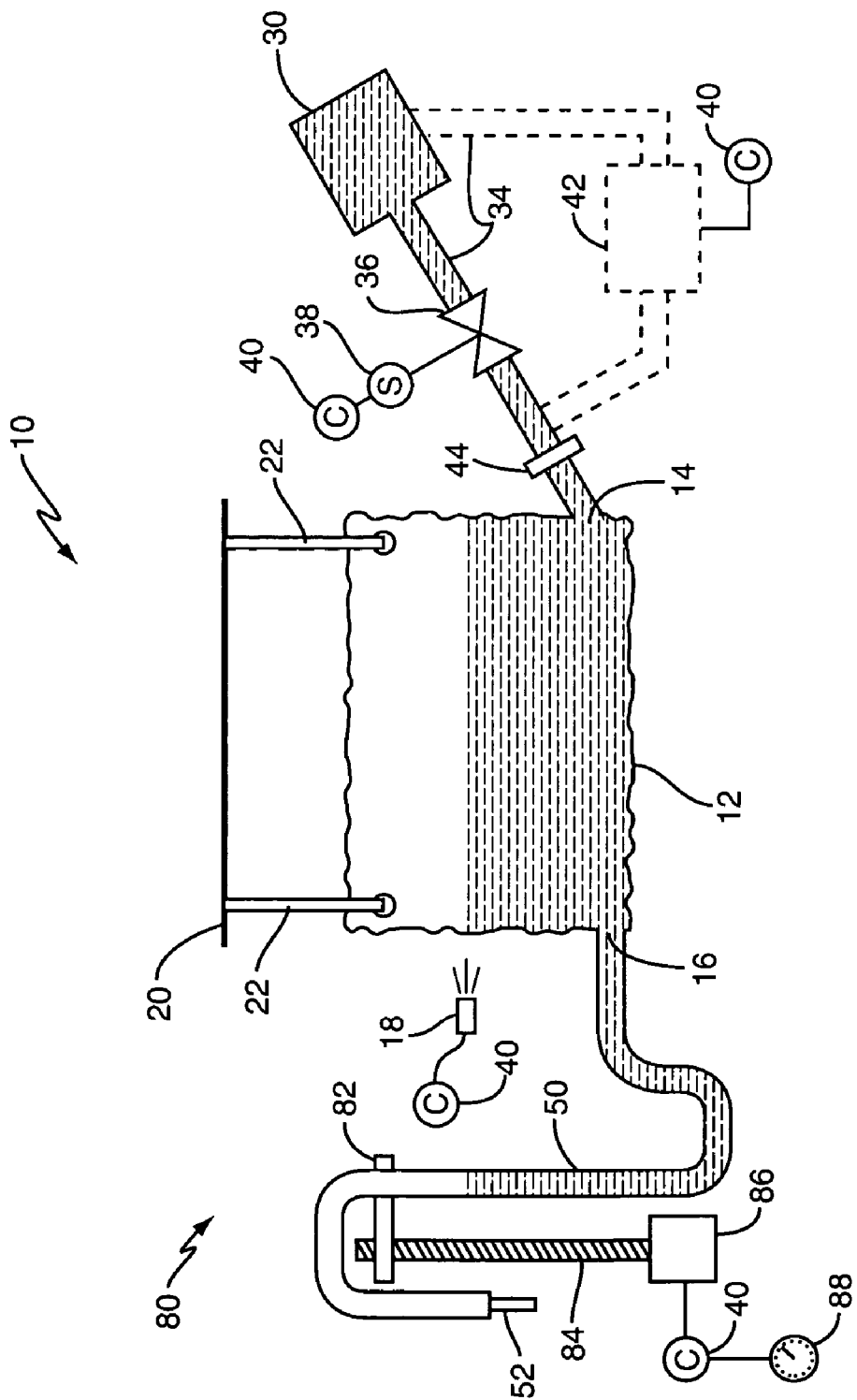
FIGS. 1A-1B illustrate a fluid dispensing apparatus according to a first embodiment of the present invention, wherein an elevator mechanism raises and lowers a dispense tube.
Figure 1B:
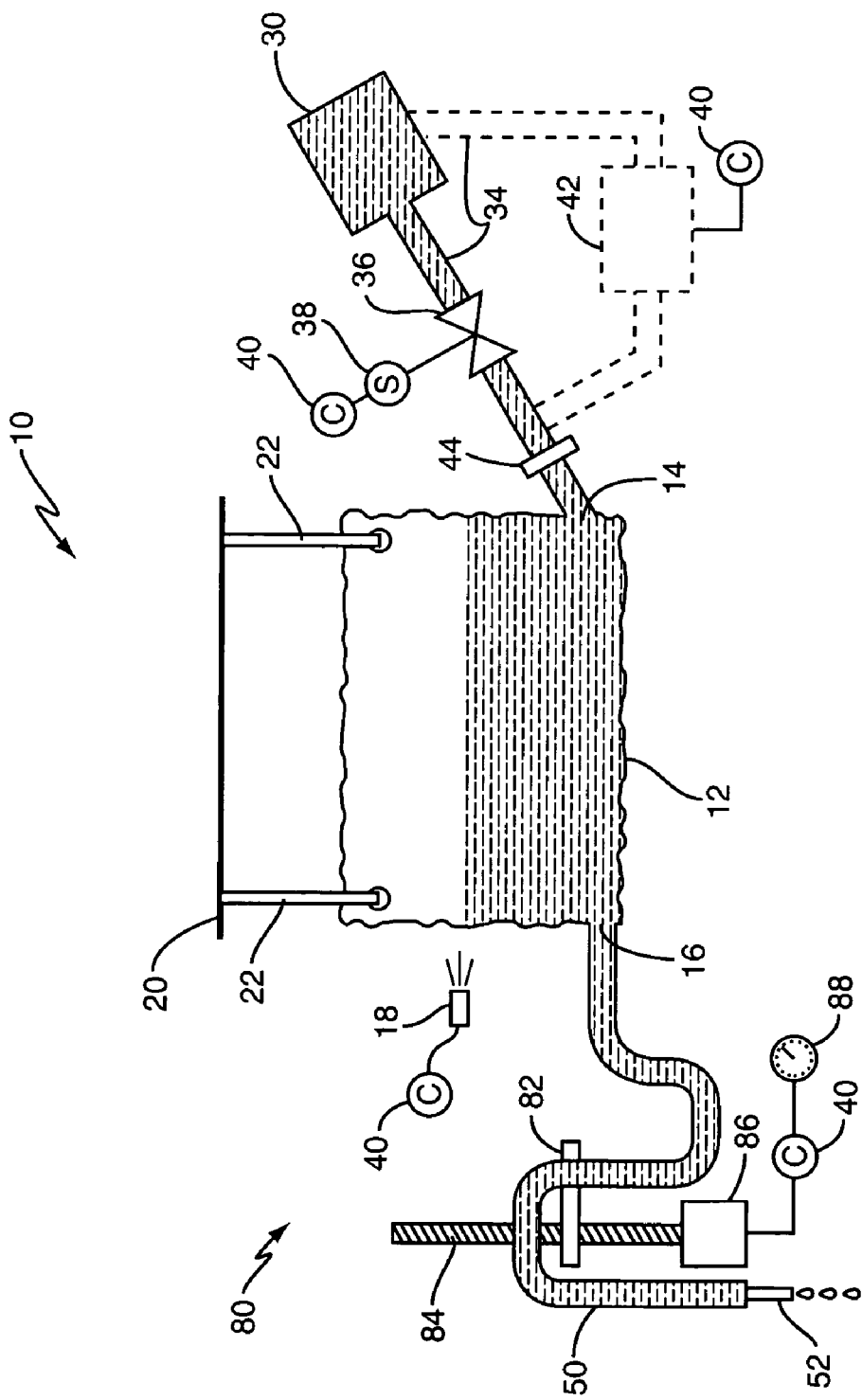

Turning now to the drawings, a fluid dispensing apparatus configured according to one embodiment of the present invention is shown therein and indicated generally by the number 10. As seen in FIGS. 1A-1B, fluid dispensing apparatus 10 comprises a fluid reservoir 12 having an inlet 14 and an outlet 16. The inlet 14 is connected to a fluid supply 30 and a supply tube 34. The outlet 16 is connected to a dispense tube 50. In general, fluid supply 30 supplies the fluid to be dispensed to fluid reservoir 12. Fluid reservoir 12 discharges fluid through dispense tube 50 into one or more bottles or containers.

In the embodiment of FIGS. 1A-1B, fluid reservoir 12 comprises a flexible fluid reservoir that holds a supply of fluid to be dispensed. Because fluid reservoir 12 is flexible, it may expand as fluid is added from fluid supply 30, and contract as fluid is discharged. A sensor 18 may be disposed proximate fluid reservoir 12 to monitor and control the volume of fluid contained within fluid reservoir 12 such that it maintains a generally constant volume. For example, sensor 18 may detect when the level of the fluid in fluid reservoir 12 falls below a predetermined level, and generate a signal to processor 40 that causes fluid supply 30 to supply additional fluid. When the fluid level returns to the predetermined level, sensor 18 generates a signal to processor 40 to stop the flow of fluid from fluid supply 30. A support bracket 20 supports the weight of fluid reservoir 12, and includes one or more supports 22 that connect to fluid reservoir 12. As described in more detail later, support bracket 20 and supports 22 may be part of a mechanism that raises and lowers fluid reservoir 12 to dispense fluid to dispensing tube 50, and/or receive fluid from fluid supply 30.

Fluid reservoir 12 is connected to fluid supply 30 by supply tube 34, which may be comprised of compressible silicon tubing. A supply valve 36, such as a diaphragm valve or pinch-valve, may be controlled by solenoid 38 and processor 40 to alternately compress and release supply tube 34 to control the flow of fluid from fluid supply 30. The processor 40 may generate the control signals to control supply valve 36 responsive to signals received from sensor 18, for example. Alternatively, processor 40 may use the signals from sensor 18 to control a pump 42. A filter 44 may be disposed along supply tube 34 to remove any particulate matter or bacteria from the fluid entering fluid reservoir 12.

The dispense tube 50 includes a dispense outlet 52 for dispensing fluids into bottles or containers. According to the present invention, fluid is dispensed when the dispense outlet 52 is positioned lower than the outlet 16 on fluid reservoir 12, and not dispensed when dispense outlet 52 is positioned higher than the outlet 16. The dispense tube 50 may be connected to an elevator mechanism 80 that raises and lowers the dispense tube 50. Alternatively, elevator mechanism 80 may raise or lower fluid reservoir 12.

The elevator mechanism 80 comprises a coupler 82 that couples the dispense tube 50 to a vertical shaft 84. Processor 40 controls an actuator 86, such as a motor for example, that raises and lowers the coupler 82 along the vertical shaft responsive to a signal from a timer 88. As the coupler 82 ascends and descends along the shaft 84, the vertical position of dispense outlet 52 changes. Moving dispense outlet 52 changes the relative vertical displacement between dispense outlet 52 and outlet 16. In FIG. 1A, elevator mechanism 80 has raised dispense outlet 52 such that it is positioned higher than outlet 16. In this configuration, no fluid is dispensed. In FIG. 1B, however, elevator mechanism 80 has lowered dispense outlet 52 such that it is positioned lower than outlet 16. In this configuration, fluid is dispensed from the dispense outlet 52 into one or more bottles or containers.

Figure 2A:
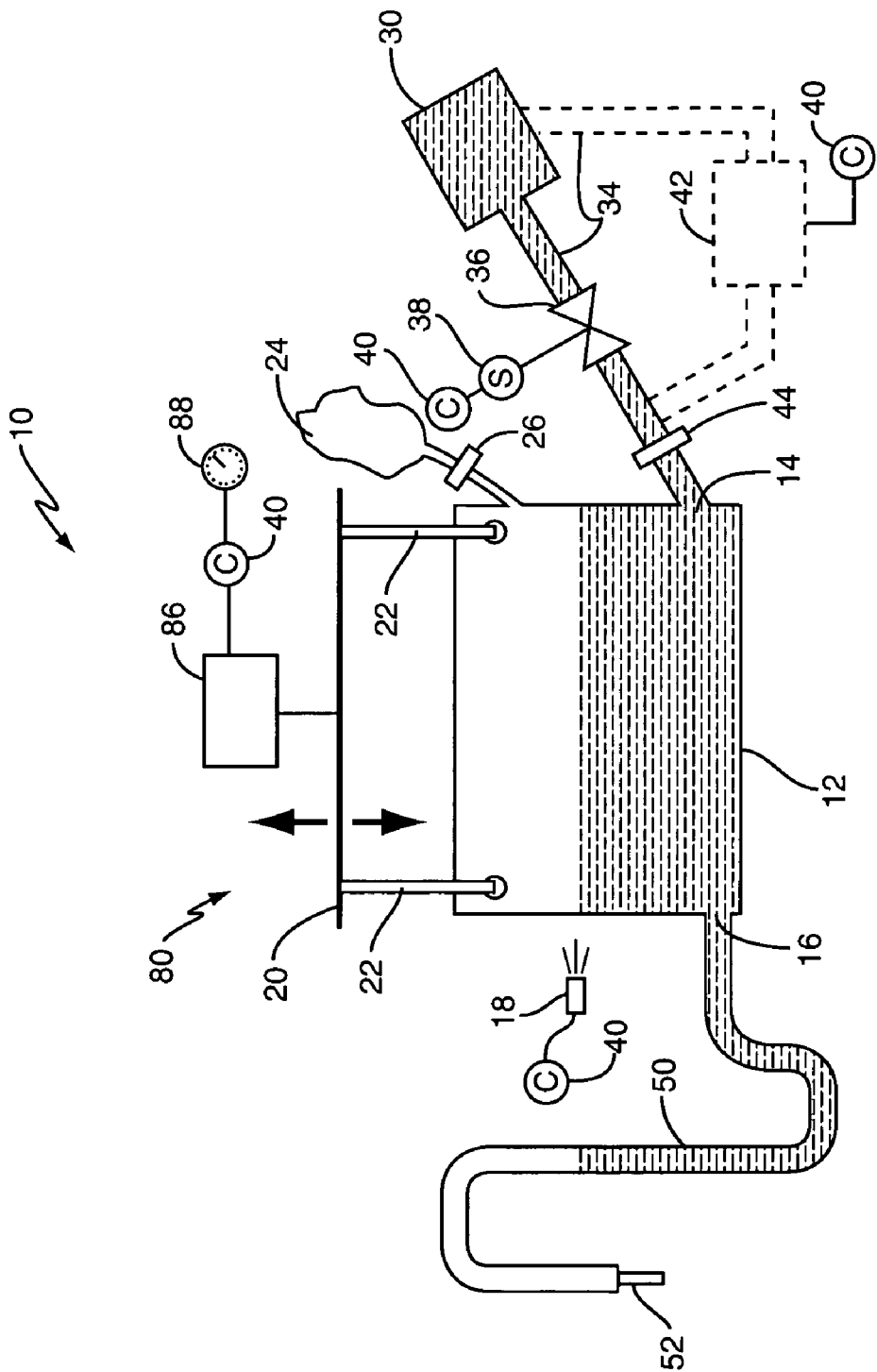
FIGS. 2A-2B illustrate a fluid dispensing apparatus according to a second embodiment of the present invention, wherein an elevator mechanism raises and lowers a fluid reservoir.
Figure 2B:
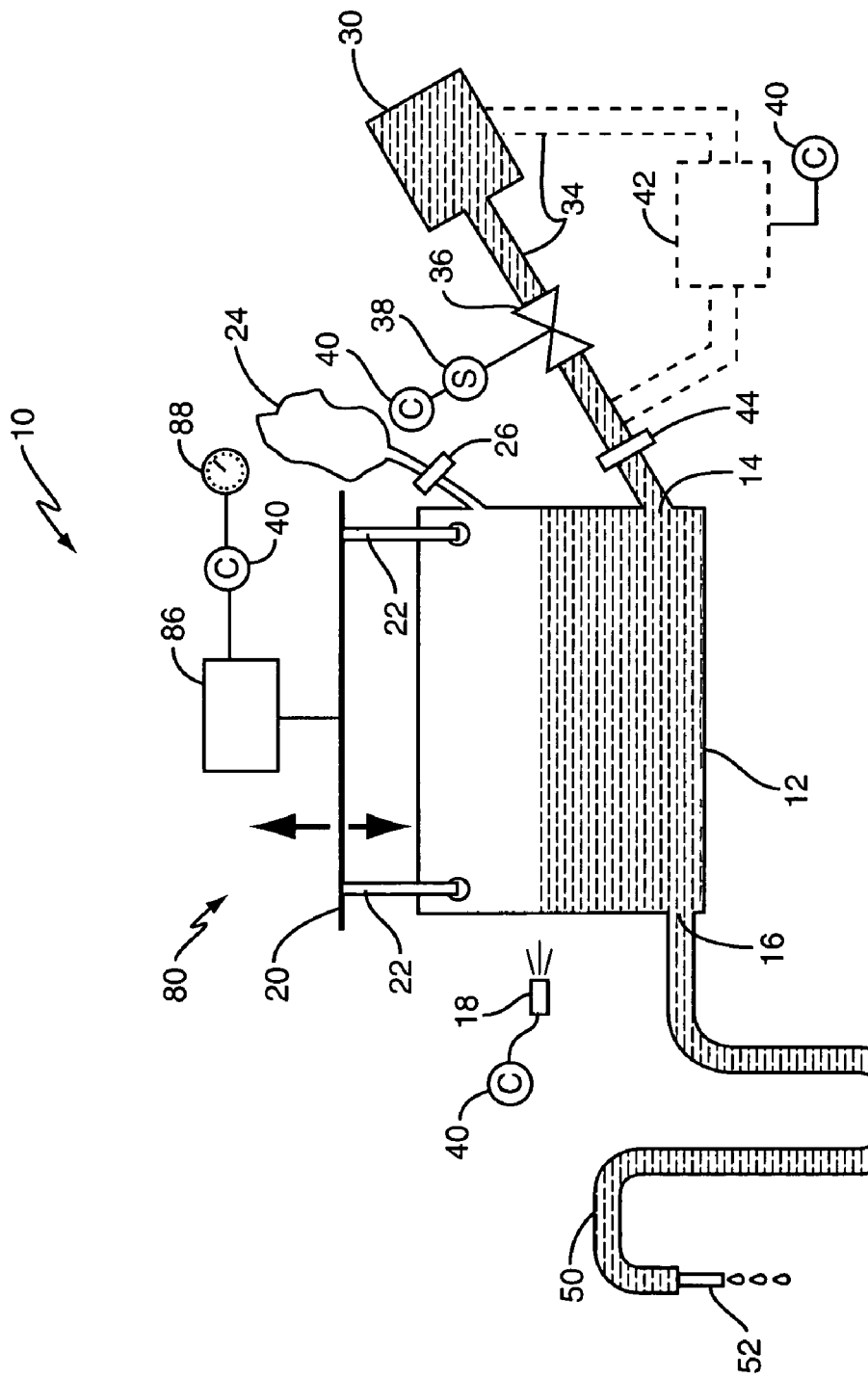

FIGS. 2A and 2B illustrate another embodiment of the present invention wherein elevator mechanism 80 raises and lowers the fluid reservoir 12 instead of the dispense tube 50. This embodiment differs structurally from the previous embodiment in that fluid reservoir 12 comprises a non-flexible tank having a rigid sidewall structure that holds the fluid received from fluid supply 30. In addition, a breather bag 24 may be connected to a vent on fluid reservoir 12 to compensate for the varying pressure as fluid is added to and removed from fluid reservoir 12. If desired, a filter 26 may be disposed between the breather bag 24 and the vent on fluid reservoir 12 to ensure that the fluid inside of the fluid reservoir 12 remains free of particulates. Optionally, breather bag 24 may be removed where filter 26 is a sterilizing grade filter.

In this embodiment, actuator 86 is coupled to support bracket 20. Actuator 86 raises and lowers the support bracket 20 and the fluid reservoir 12 responsive to processor 40 and timer 88. As in the previous embodiment, raising and lowering fluid reservoir 12 changes the relative vertical displacement between dispense outlet 52 and outlet 16 such that dispense outlet 52 is positioned lower than outlet 16 to dispense the fluid (FIG. 2B), and positioned higher than outlet 16 to stop dispensing the fluid (FIG. 2A). In addition, elevator mechanism 80 may also be responsive to signals generated by sensor 18. Particularly, elevator mechanism 80 may lower fluid reservoir 12 whenever sensor 18 detects that the fluid level within fluid reservoir 12 has reached a predetermined level. The fluid is dispensed and, when timer 88 expires, elevator mechanism 80 may raise fluid reservoir 12 to stop dispensing the fluid.

Figure 3:
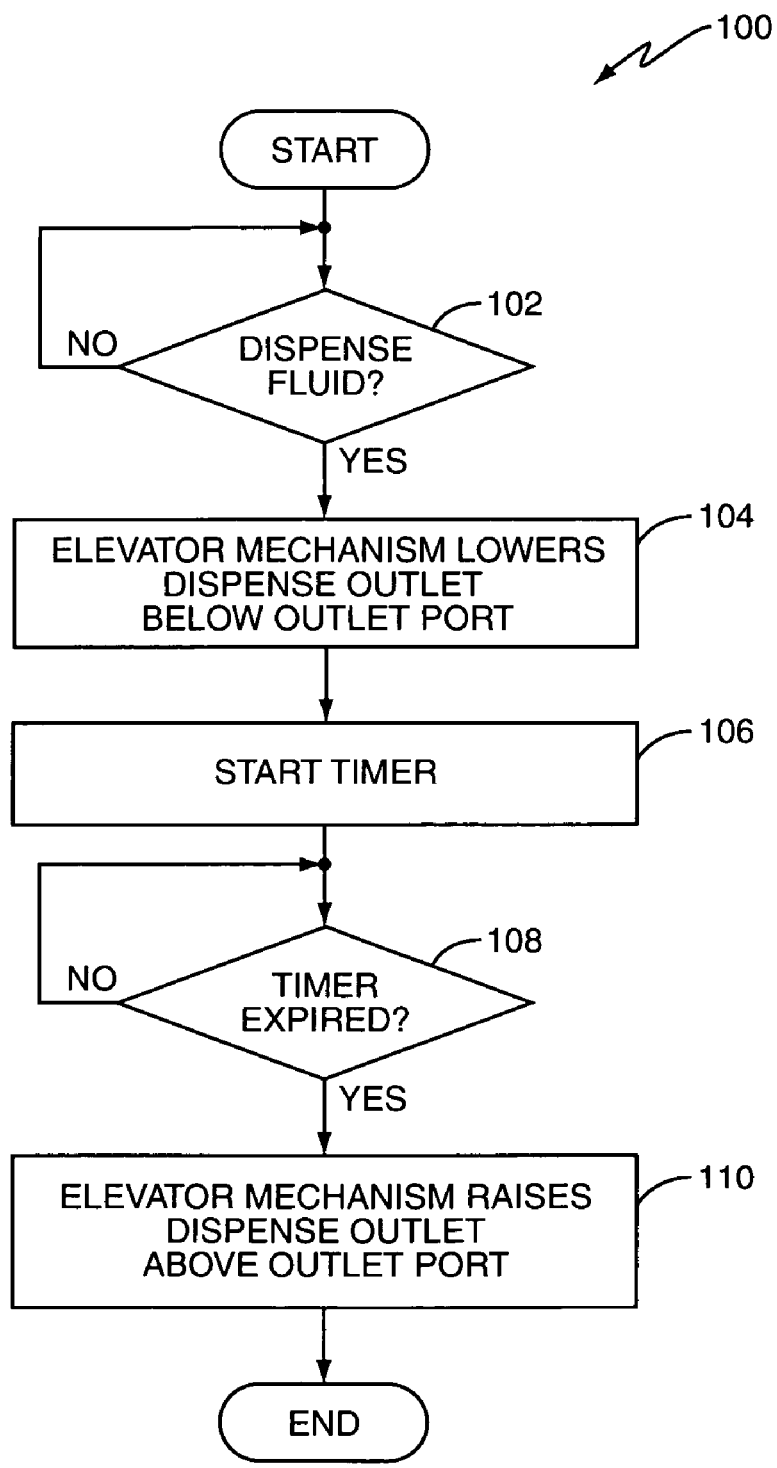
FIG. 3 illustrates a method of operating the fluid dispensing apparatus according to one embodiment of the present invention.

FIG. 3 illustrates a method 100 of operating the fluid dispensing apparatus 10. It should be noted that the method of FIG. 3 is discussed in terms of the embodiment shown in FIGS. 1A-1B. However, this is for illustrative purposes only. The method of FIG. 3 may equally be applied to the embodiment shown in FIGS. 2A-2B.

The method begins when the dispense outlet 52 is in the raised position (FIG. 1A). In this configuration, no fluid is dispensed. When processor 40 receives a signal to begin a dispense cycle (box 102), processor 40 generates a control signal to actuator 86. The actuator 86 may then lower coupler 82 along shaft 84 responsive to the control signal (box 104). Processor 40 may also generate a control signal to start a timer (box 106). Dispense outlet 52 descends along shaft 84 and, when it reaches a position that is lower than outlet 16, dispenses the fluid in the dispense tube into a container (FIG. 1B). When the timer expires (box 108), processor 40 generates a control signal that causes actuator 86 to raise the dispense outlet 52 back to its starting position (box 110).

Figure 4A:
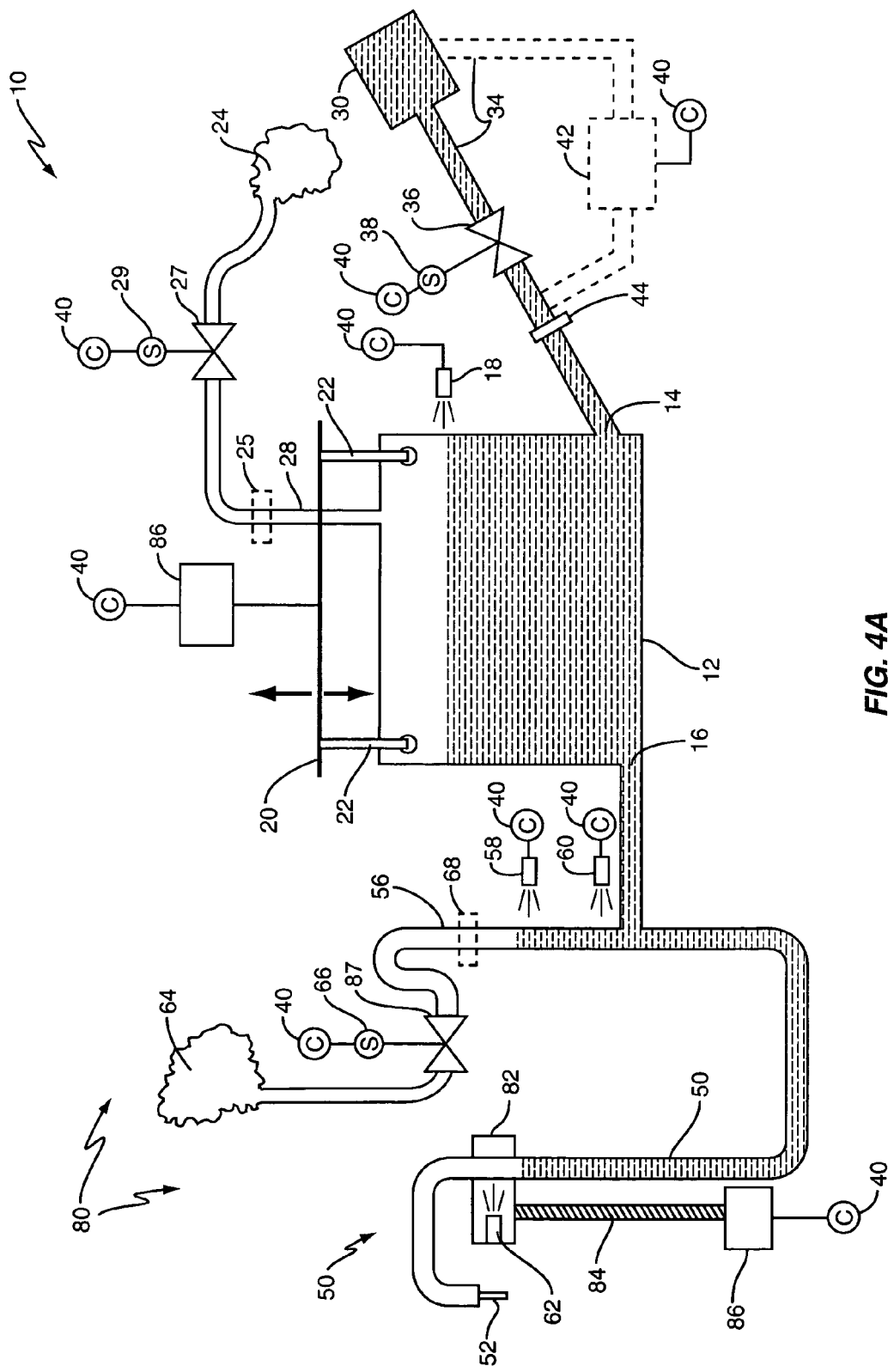
FIGS. 4A-4B illustrate a fluid dispensing apparatus configured according to an alternate embodiment of the present invention.
Figure 4B:
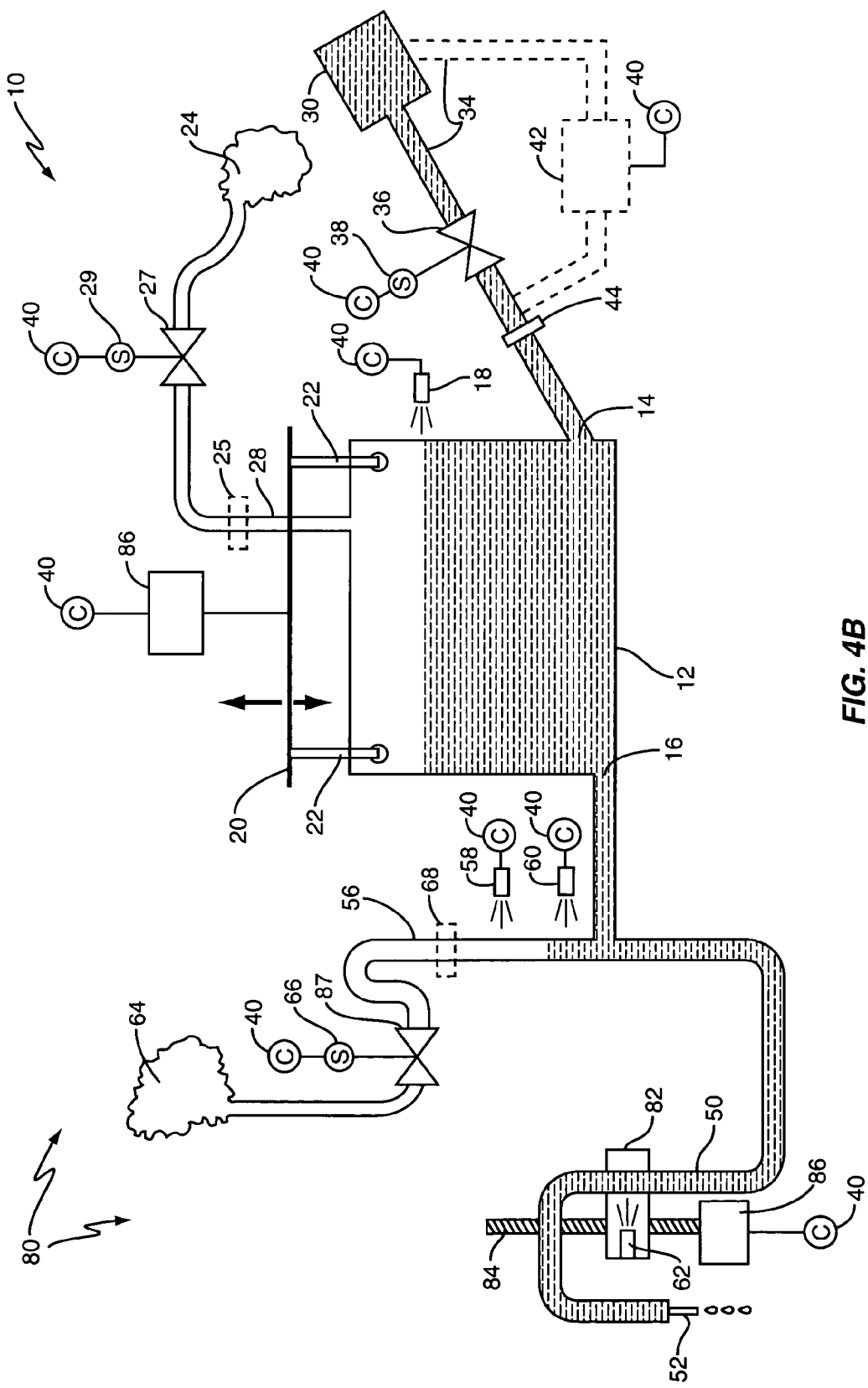
Figure 4C:
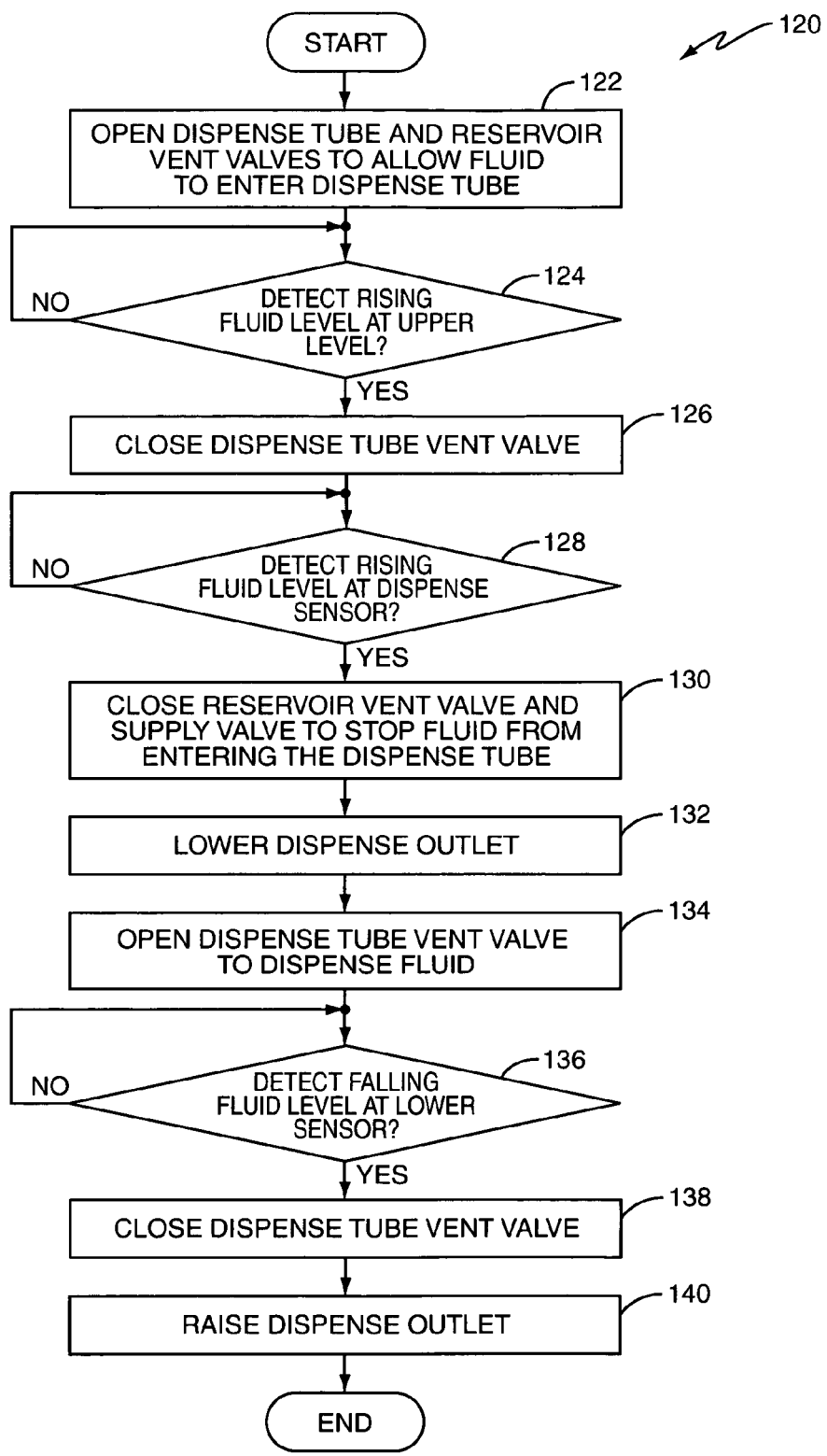
FIG. 4C illustrates a method of operating the fluid dispensing apparatus according to an alternate embodiment of the present invention.

FIGS. 4A-4C illustrate another alternate embodiment of the present invention that dispenses a predetermined volume of fluid into one or more bottles or containers. Structurally, the embodiment of FIGS. 4A-4B differs from the previous embodiments in that fluid reservoir 12 is rigid and a breather bag 24 connects to fluid reservoir 12 by a reservoir vent tube 28. Where the apparatus 10 does not include breather bags 64 and/or 24, optional filters 25 and/or 68 may be used to prevent particulate matter from contaminating the fluid. A reservoir vent valve 27 is responsive to solenoid 29 and processor 40, and alternately opens and closes to control the flow of fluid into and out of fluid reservoir 12. Particularly, when reservoir vent valve 27 is in the open position, fluid may flow freely into and out of reservoir 12. When reservoir vent valve 27 and supply valve 36 are closed, however, fluid does not flow into or out of fluid reservoir 12.

Additionally, dispense tube 50 includes a measuring portion 56 that measures and holds a predetermined volume of fluid to be dispensed. A breather bag 64 compensates for varying pressures in measuring portion 56, while solenoid 66 and processor 40 open and close dispense vent valve 87. When the dispense vent valve 87 is open, fluid may freely flow into and out of measuring portion 56. In the closed position, fluid is prevented from flowing out of measuring portion 56.

The embodiment of FIGS. 4A-4B also include an upper sensor 58, a lower sensor 60, and a dispense sensor 62, each of which may be communicatively connected to processor 40. The sensors 58, 60, and 62 may cooperate to control the fluid dispensing operations. As seen in FIG. 4A, the dispense sensor 62 is positioned above the upper and lower sensors 58, 60, but below sensor 18. Additionally, dispense sensor 62 is connected to coupler 82 such that it ascends and descends along shaft 84 in conjunction with dispense tube 50. Sensors 58 and 60 are in fixed positions proximate the measurement portion 56 of dispense tube 50.

FIG. 4C illustrates a method 120 of operating the fluid dispensing apparatus 10 according to the embodiment of FIGS. 4A-4B. Prior to dispensing a predetermined volume of fluid, reservoir vent valve 27 and dispense tube vent valve 87 are opened to allow fluid to flow from fluid reservoir 12 into dispense tube 50 (box 122). Supply valve 36 may be open or closed depending upon the need to replenish fluid reservoir 12 with fluid as determined by sensor 18. The level of the fluid entering the dispense tube 50 rises until upper sensor 58 detects the fluid (box 124). Sensor 58 then generates a signal to processor 40 to close dispense tube vent valve 87 (box 126). The fluid continues to rise in the dispense tube 50 to the level of dispense sensor 62. Upon detecting the fluid, (box 128), dispense sensor 62 generates a signal to close reservoir vent valve 27 and supply valve 36 to stop the flow of fluid into the dispense tube 50 (box 130). The dispense tube 50 now holds a predetermined volume of fluid to be dispensed.

Dispense sensor 62 also generates a signal to processor 40 to begin dispensing the fluid into a bottle or container. Particularly, processor 40 controls actuator 86 to lower dispense tube 50 along vertical shaft 84 (box 132). This lowers dispense outlet 52 to a position where the dispense outlet 52 is lower than the outlet 16 on reservoir 12. Once dispense outlet 52 is lowered into position, dispense tube vent valve 87 is opened to allow the fluid to drain into the container or bottle (box 134). Lower sensor 60 detects the falling fluid level in dispense tube 50 as the fluid drains into the container or bottle (box 136), and generates a signal to close dispense tube vent valve 87 (box 138). This stops the fluid from draining from dispense tube 50. Lower sensor 60 also generates a signal to processor 40 to raise dispense tube 50 along vertical shaft 84 to return it to its original position. That is, dispense outlet 52 returns to a position that is higher than the position of outlet 16 (box 140).

Therefore, elevator mechanism 80 may be responsive to one or more sensors or timers to dispense or not dispense a fluid by changing the relative vertical displacement between the dispense outlet 52 and the outlet 16 on fluid reservoir 12. Particularly, elevator mechanism 80 may raise and lower the dispense tube 50 and/or reservoir 12, as shown in the previous embodiments, to change the relative vertical displacement between the dispense outlet 52 and the outlet 16. Additionally, however, elevator mechanism 80 could also be responsive to other sensors such as a sensor associated with the weight verification mechanism 150 shown in FIGS. 5A-5C.

Weight verification mechanism 150 comprises a chamber 152 that contains a liquid medium 154. The liquid medium 154 may be, for example, a silicone liquid that does not readily evaporate at operating temperature. A displacement float 156 is disposed at least partially inside of chamber 152, and floats on liquid medium 154. Weigh verification mechanism 150 further includes a platform 158 that connects to displacement float 156 by a platform support 160. A bushing 162 may be disposed on platform support 160 to prevent the sides of displacement float 156 from contacting the interior walls of chamber 152. A sensor 164 is movably attached to a sensor mount 166, and generates signals for processor 40 based on the detected level of liquid medium 154.

As seen in FIG. 5B, placing an empty container 170 on platform 158 causes displacement float 156 to sink slightly in liquid medium 154. The displaced volume of liquid medium 154 rises between the outer wall of displacement float 156 and interior wall of chamber 152. Processor 40 generates a control signal to move sensor 164, which was previously set to monitor the level of the liquid medium 156 associated with no container 170 (FIG. 5A), to the new level of liquid medium 154 associated with the empty container 170 (FIG. 5B). Sensor 164 detects the new level of liquid medium 154 and generates a signal to processor 40. Processor 40 may then control elevator mechanism 80 to lower dispense tube 50 such that dispense outlet 52 is positioned lower than outlet 16 on fluid reservoir 12.

Processor 40 calculates what the level of liquid medium 154 should be when container 170 is full of fluid, and moves sensor 164 to that position (FIG. 5C) while fluid is being dispensed. This position represents a level at which the displaced liquid medium 154 is proportional to the predetermined volume of fluid to be dispensed. When sensor 164 detects the rising level of the liquid medium 154, it generates a signal that causes processor 40 to control elevator mechanism 80 to stop dispensing the fluid into container 170. Particularly, elevator mechanism 80 may raise dispense tube 50 such that dispense outlet 52 returns to its position above outlet 16. If the level of the liquid medium 154 is lower than the expected level, processor 40 may calculate the volume of additional fluid needed, and move sensor 164 to a new position. Additional fluid equal to the subsequently calculated volume may then be dispensed into container 170 by controlling elevator mechanism 80 to lower dispense tube 50. Conversely, if the level of the liquid medium 154 is higher than the expected level calculated by processor 40, the container may be removed manually or mechanically.

Figure 7:
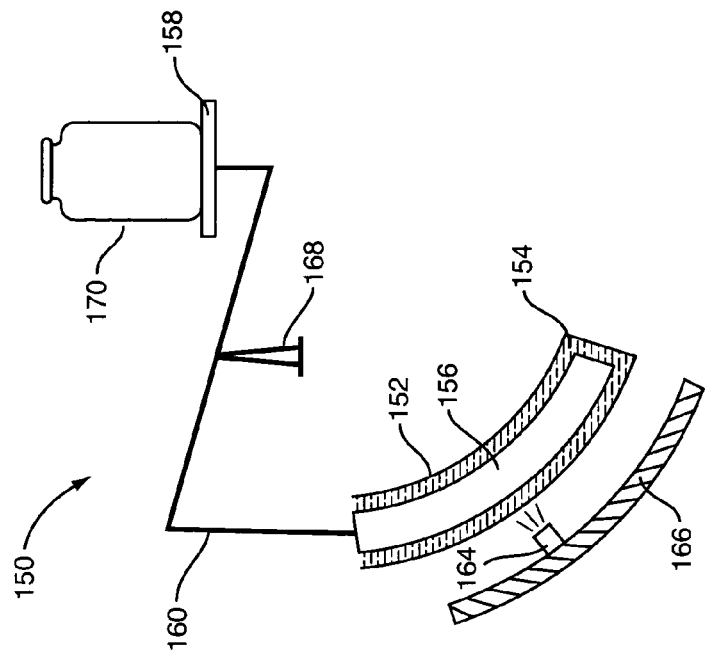
FIGS. 6-8 illustrate alternate embodiments of a weight verification mechanism for use with the fluid dispensing apparatus according to one embodiment of the present invention.
Figure 6:
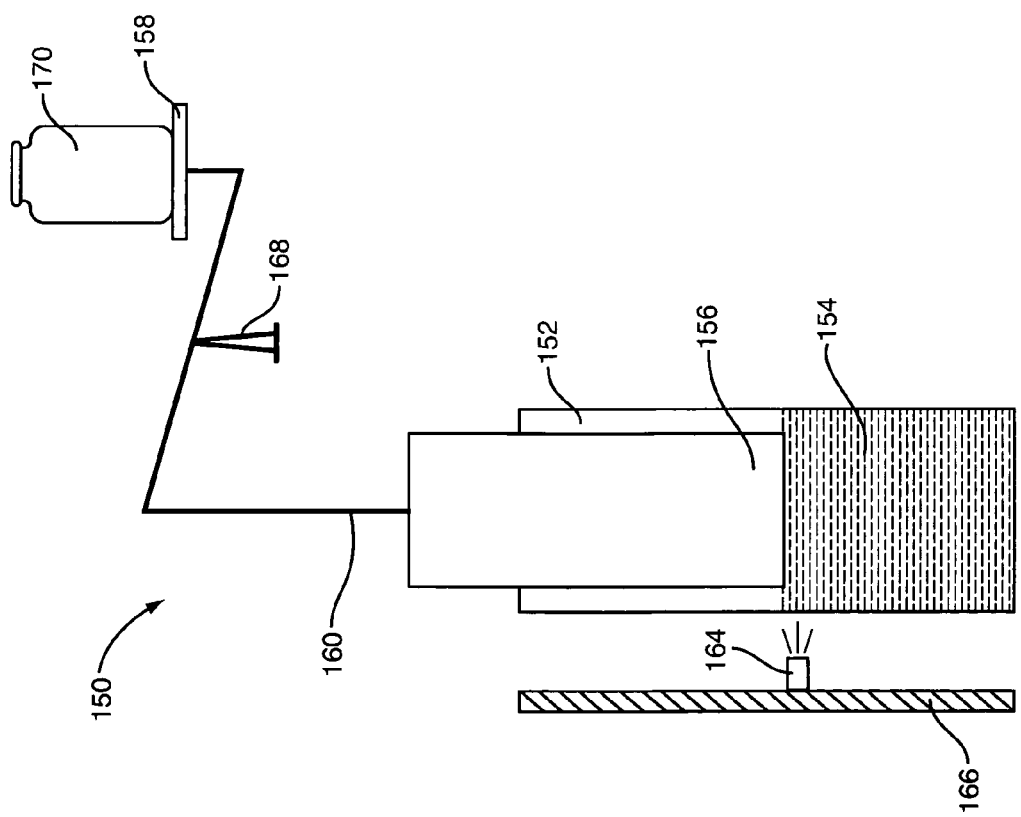

FIGS. 6 and 7 illustrate alternate embodiments of the weight verification mechanism 150. The embodiments of FIGS. 6 and 7 include a pivot 168. Further, the weight verification mechanism 150 of FIG. 7 includes an arcuate chamber 152, displacement float 154, and sensor mount 166. In these embodiments, sensor 164 detects a falling level of the liquid medium 154 as container 170 fills with fluid dispense outlet 52.

Figure 8:
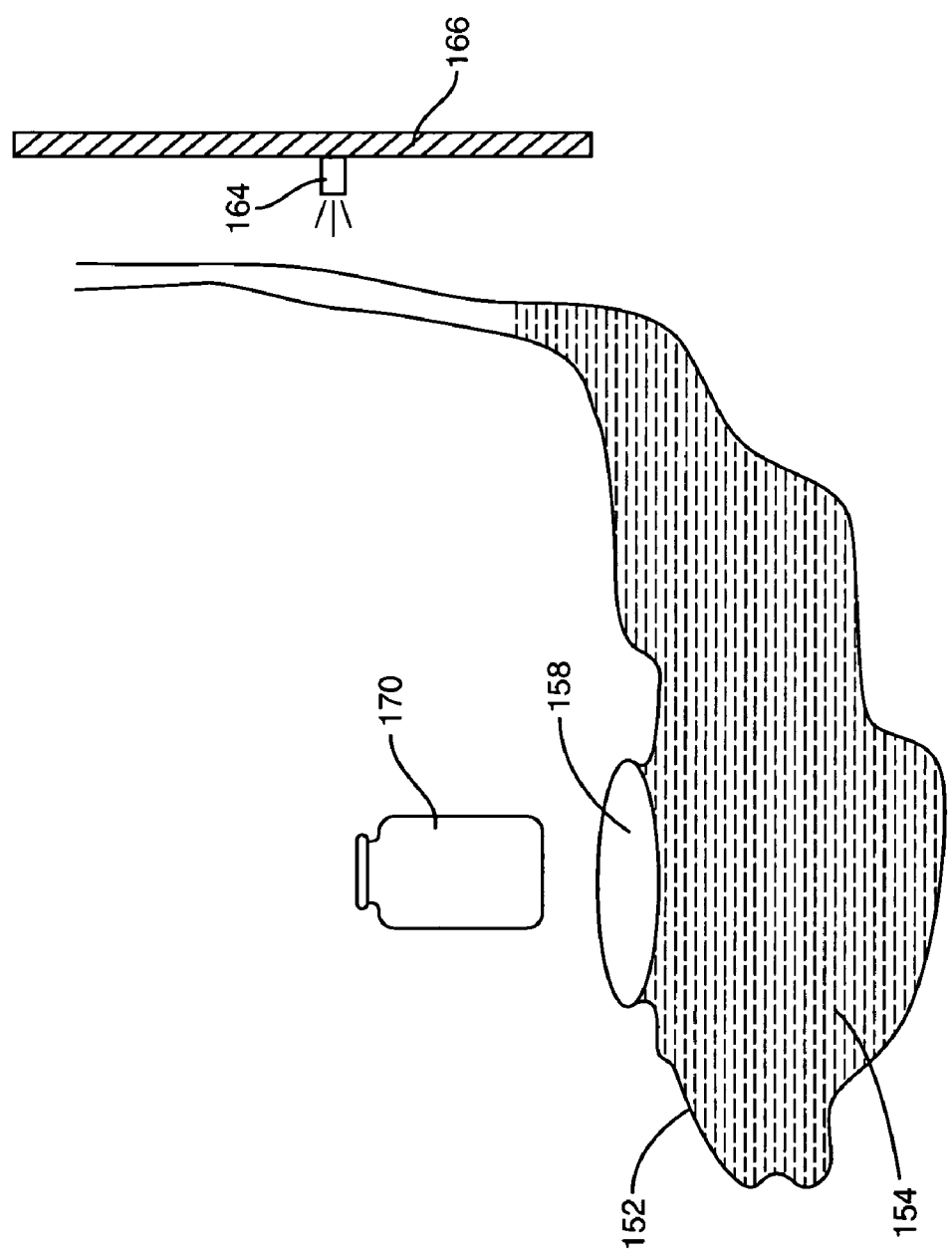

FIG. 8 illustrates another embodiment of the weight verification mechanism 150 wherein the chamber 152 comprises a flexible bag filled with the liquid medium 154. When container 170 is placed on platform 158, sensor 164 moves along sensor mount 166, and detects the displacement of the liquid medium 154 as previously described.

It should be noted that the drawings illustrate the elevator mechanism 80 as raising the dispense tube 50 to a level where the dispense outlet 52 remains below the level of the fluid in the fluid reservoir 12. This might prevent the need to have to fully recharge the dispense tube 50 with fluid after each dispensing cycle. Particularly, after the elevator mechanism 80 raises the dispense tube 50, some amount of fluid may remain inside the dispense tube. Raising the dispense tube 50 such that the dispense outlet 52 remains below the fluid level in the fluid reservoir 12 could prevent or inhibit this remaining fluid from draining back into the fluid reservoir 12. Thus, the dispense tube 50 may remain "primed" with some amount of fluid. This might negate the need to fully charge the dispense tube 50 with fluid prior to each dispensing cycle. However, those skilled in the art will readily appreciate that raising the dispense tube 50 such that the dispense outlet 52 remains below the level of fluid in the fluid reservoir is not required by the present invention. The elevator mechanism 80 may raise the dispense tube 50 and/or reservoir 12 to any level desired.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A fluid dispensing apparatus to dispense a predetermined volume of fluid comprising:
   a fluid reservoir connected to a fluid supply;
   a dispense tube connected to the fluid reservoir and having a dispense outlet, said dispense tube comprising a measurement portion to measure a predetermined volume of fluid to be dispensed, and a dispense portion to dispense the predetermined volume of fluid;
   a dispense tube vent valve connected to the dispense tube;
   an elevator mechanism to selectively raise and lower the dispense portion of the dispense tube;
   a first measurement sensor disposed proximate the measurement portion of the dispense tube to generate a first signal responsive to detecting when a rising volume of fluid in the measurement portion has reached a desired fill level;
   a second measurement sensor disposed proximate the measurement portion and below the first sensor generate a second signal responsive to detecting when a falling volume of fluid in the measurement portion has reached a desired dispense level; and
   a dispensing sensor disposed proximate the dispense portion to generate a third signal responsive to detecting when the dispense tube is filled to a predetermined level;
   a processor programmed to:
      control the elevator mechanism to raise the dispense tube to a raised filling position to prevent fluid flow from the dispense outlet;
      open the dispense tube vent valve when the dispense tube is in the raised filling position;
      fill the dispense tube with fluid from the fluid reservoir to the level of the dispensing sensor;
      close the dispense vent valve responsive to the first signal when the fluid level in the measurement portion rises to the level of the first sensor;
      control the elevator mechanism to lower the dispense tube to a lowered dispensing position responsive to the third signal from the dispensing sensor;
      open the dispense tube vent valve when the dispense tube is in the lowered dispensing position to dispense the predetermined volume of fluid from the dispense tube; and
      close the dispense tube vent valve responsive to the second signal indicating that the predetermined volume of fluid has been dispensed.

2. The fluid dispensing apparatus of claim 1 wherein the dispensing sensor is raised and lowered along with the dispense tube.

3. The fluid dispensing apparatus of claim 1 further comprising a reservoir vent valve connected to the fluid reservoir, and wherein the processor is further programmed to open the reservoir vent valve while filling the dispense tube and to close the reservoir vent valve to stop the flow of fluid into the dispense tube when the dispense tube is filled.

4. The fluid dispensing apparatus of claim 1 wherein the elevator mechanism comprises a vertical shaft connected to the dispense tube, and wherein the dispense tube is raised and lowered along the vertical shaft between the raised filling position and lowered dispensing position.

5. The fluid dispensing apparatus of claim 1 further comprising a supply valve operatively connected to the fluid reservoir, and wherein the processor is configured to open and close the supply valve to control an inflow of the fluid into the fluid reservoir.

6. The fluid dispensing apparatus of claim 1 further comprising a breather device connected to the dispense tube to compensate for varying pressures in the dispense tube.

7. A method of dispensing a predetermined volume of fluid, the method comprising:
   control an elevator mechanism to raise a dispense tube to a raised filling position to prevent fluid flow from the dispense tube, said dispense tube comprising a measurement portion to measure a predetermined volume of fluid to be dispensed, and a dispense portion to dispense the predetermined volume of fluid;
   opening a dispense vent valve operatively connected to the dispense tube when the dispense tube is in the raised filling position;
   filling the dispense tube with fluid from a fluid reservoir connected to the dispense tube while the dispense tube is in the raised filling position;
   closing the dispense vent valve when the fluid level in the measurement portion of the dispense tube reaches a first measurement sensor;
   control the elevator mechanism to lower the dispense tube to a lowered dispensing position with the dispense tube vent valve closed responsive to the fluid level in the dispense tube reaching the level of a dispensing sensor;
   opening the dispense tube vent valve when the dispense tube is in the lowered dispensing position to dispense the predetermined volume of fluid from the dispense tube; and
   closing the dispense tube vent valve responsive to the fluid level in the measurement portion of the dispense tube reaching the level of a second measurement sensor.

8. The method of claim 7 further comprising raising and lowering a dispensing sensor along with the dispense tube.

9. The method of claim 7 further comprising controlling a reservoir vent valve connected to the fluid reservoir to open while the dispense tube is being filled and to close to stop the flow of fluid into the dispense tube when the dispense tube is filled.

10. The method of claim 7 wherein raising and lowering the dispense tube comprises raising and lowering the dispense tube along a vertical shaft between the raised filling position and lowered dispensing position.

11. The method of claim 7 further comprising selectively opening and closing a supply valve operatively connected to the fluid reservoir to control an inflow of the fluid into the fluid reservoir.

12. The method of claim 7 further comprising compensating for varying pressures within the dispense tube using a breather device connected to the dispense tube.

13. A fluid dispensing apparatus to dispense a predetermined volume of fluid comprising:
   a fluid reservoir connected to a fluid supply;
   a dispense tube connected to the fluid reservoir and having a dispense outlet, said dispense tube comprising a measurement portion to measure a predetermined volume of fluid to be dispensed, and a dispense portion to dispense the predetermined volume of fluid;
   a dispense tube vent valve connected to the dispense tube;
   an elevator mechanism to selectively raise and lower the dispense portion of the dispense tube;
   a weight verification mechanism configured to hold a receptacle receiving the fluid being dispensed from the dispense tube, the weight verification mechanism comprising a liquid medium that is displaced when the receptacle is receiving the predetermined volume of fluid being dispensed, and a displacement sensor configured to detect a displacement level of the liquid medium and to generate a signal based on the detected displacement level;
   a processor programmed to:
   control the elevator mechanism to raise the dispense tube to a raised filling position for filled;
   fill the dispense tube with fluid while the dispense tube is in the raised position;
   open the dispense vent valve while the dispense tube is being filled;
   close the dispense vent valve when the fluid in the measurement portion reaches a predetermined level;
   control the elevator mechanism to lower the dispense tube to a lowered dispensing position after the dispense tube is filled;
   open the dispense tube vent valve when the dispense tube is in the lowered dispensing position to dispense a predetermined volume of fluid from the dispense tube; and
   close the dispense tube vent valve responsive to a signal from the displacement sensor indicating that a predetermined volume of fluid has been dispensed.

14. The fluid dispensing apparatus of claim 13 wherein the processor is configured to:
   lower the dispense tube to the lowered dispensing position responsive to the displacement sensor detecting the liquid medium at a first displacement level; and
   raise the dispense tube to the raised filling position responsive to the displacement sensor detecting the liquid medium at a second displacement level.

15. The fluid dispensing apparatus of claim 13 wherein the processor is configured to:
   move the displacement sensor to a first displacement level prior to filling the receptacle with the predetermined volume of fluid;
   calculate a position for a second displacement level; and
   move the displacement sensor to the second displacement level when the predetermined volume of fluid is being dispensed into the receptacle.

16. The fluid dispensing apparatus of claim 13 wherein the processor is further configured to:
   determine whether the receptacle holds less than the predetermined volume of fluid based on the displacement level of the liquid medium;
   if the receptacle holds less than the predetermined volume of fluid, calculate an additional volume of fluid needed to fill the receptacle with the predetermined volume of fluid, and fill the receptacle with the additional volume of fluid.

* * * * *